United States Patent [19]

Fry

[11] Patent Number: 5,194,299
[45] Date of Patent: Mar. 16, 1993

[54] REPOSITIONABLE PRESSURE-SENSITIVE ADHESIVE SHEET MATERIAL

[75] Inventor: Arthur L. Fry, Saint Paul, Minn.

[73] Assignee: Minnesota Mining and Manufacturing Company, St. Paul, Minn.

[21] Appl. No.: 948,095

[22] Filed: Dec. 31, 1986

Related U.S. Application Data

[60] Division of Ser. No. 662,605, Oct. 19, 1984, abandoned, which is a continuation-in-part of Ser. No. 662,605, Oct. 19, 1984, abandoned.

[51] Int. Cl.$^5$ .............................................. B32B 31/00
[52] U.S. Cl. .................................. 427/208.6; 427/421; 427/284; 427/285; 428/194; 428/198; 428/201; 428/202; 428/211; 428/343
[58] Field of Search ............... 428/194, 198, 211, 343, 428/40, 202, 201; 427/208.6, 421, 284, 285

[56] References Cited

U.S. PATENT DOCUMENTS

| | | | |
|---|---|---|---|
| 1,944,834 | 1/1934 | Bennett, Jr. | 154/43 |
| 2,000,475 | 5/1935 | O'Donnell | 154/43 |
| 2,116,289 | 5/1938 | Shepherd | 91/50 |
| 2,264,629 | 12/1941 | Engert et al. | 40/2 |
| 2,349,709 | 5/1944 | Evans | 117/44 |
| 2,386,731 | 10/1945 | Wenzelberger | 91/50 |
| 2,515,473 | 7/1950 | Ptasnik | 117/44 |
| 2,721,810 | 10/1955 | Schram | 117/45 |
| 2,729,193 | 1/1956 | Scholl | 118/202 |
| 2,750,942 | 6/1956 | Robson | 128/156 |
| 2,940,868 | 6/1960 | Patchell | 117/38 |
| 3,033,702 | 5/1962 | Fenselau | 117/38 |
| 3,174,888 | 3/1965 | Morgan | 156/230 |
| 3,671,284 | 6/1972 | Uhrig | 117/21 |
| 3,691,140 | 9/1972 | Silver | 260/78.5 |
| 3,741,786 | 6/1973 | Torrey | 117/3.1 |
| 3,808,088 | 4/1974 | Knechiges et al. | 161/148 |
| 3,811,438 | 5/1974 | Economou | 128/156 |
| 3,857,731 | 12/1974 | Merrill, Jr. et al. | 117/122 |
| 3,900,642 | 8/1975 | Michel | 428/40 |
| 3,967,624 | 7/1976 | Milnamow | 128/287 |
| 4,004,049 | 1/1977 | Horwat et al. | 427/208.6 |
| 4,063,559 | 12/1977 | Tritsch | 128/287 |
| 4,166,152 | 8/1979 | Baker et al. | 428/522 |
| 4,460,634 | 7/1984 | Hasegawa | 428/124 |

FOREIGN PATENT DOCUMENTS 1541311 2/1979 United Kingdom .

Primary Examiner—Alexander S. Thomas
Attorney, Agent, or Firm—Gary L. Griswold; Walter N. Kirn; Thomas J. Odar

[57] ABSTRACT

Pressure-sensitive adhesive sheet material having the ability to be applied to paper and removed therefrom without lifting fibers or delaminating the paper. The otherwise conventional pressure-sensitive adhesive is applied to the backing by spraying, resulting in a non-repetitive pattern of adhesive islands.

5 Claims, 1 Drawing Sheet

REPOSITIONABLE PRESSURE-SENSITIVE ADHESIVE SHEET MATERIAL

CROSS REFERENCE TO RELATED APPLICATION

This application is a division and continuation-in-part of Ser. No. 662,605, filed Oct. 19, 1984 now abandoned.

BACKGROUND OF THE INVENTION

This invention relates to normally tacky and pressure-sensitive adhesive sheet material and is particularly concerned with repositionable products.

In the mid-1970's applicant's assignee introduced repositionable adhesive tapes and note papers, which found an immediate acceptance and today provide a substantial volume of business. The adhesive utilized in these products, typically present in a narrow band adjacent one edge of the sheet material, consists essentially of an adhesive binder layer containing numerous infusible, solvent-dispersible tacky elastomeric microspheres that typically have a diameter of 50-75 micrometers. In another embodiment of this type of product, bulletin boards are surfaced with sheet material bearing the same repositionable adhesive, so that notices, pictures, clippings, etc. can be temporarily adhered, removed, and repositioned; see, e.g., U.S. Pat. No. 3,857,731.

Products of the type described in the preceding paragraph can be adhered to almost any substrate, including paper (even such weak paper as newsprint), readily removed without delaminating the substrate, and subsequently repositioned. The force required to peel these products from a paper substrate is maintained in the approximate range of 8 to 80 (preferably 10 to 50) grams per centimeter width; products having significantly lower peel adhesion (e.g., less than 8 g/cm width) generally lack the ability to resist inadvertent removal, often falling off. Products having significantly higher peel adhesion (e.g., more than 80 g/cm) on the other hand, tend to tear or delaminate weak papers at normal removal rates. Application of the adhesive coating so as to achieve consistent peel adhesion values requires considerable knowhow, and the adhesive compositions themselves are relatively expensive to manufacture.

Numerous attempts have been made to achieve the results obtainable with microsphere adhesives by substituting more conventional pressure-sensitive adhesives (psas), which typically have continuous-coat (100% coverage) peel adhesion values, when applied to untreated paper, on the order of 100-1000 g/cm. width. (Representative adhesion values include the following: matte finish acetate tape, 107 g/cm; masking tape, 227 g/cm; book repair tape, 443 g/cm; package sealing tape, 830 g/cm; filament tape, 937 g/cm.) One approach has been to use a psa having inherently low tack, but it has been found difficult, if not impossible, to maintain consistent peel adhesion values, the nature of the note paper backing and the thickness of the adhesive layer both profoundly affecting performance. Another approach has been to apply a thinner coating than normal, it being recognized that this will reduce peel adhesion. Unfortunately, however, it is almost impossible to prepare consistent coatings having removal values in the 10-50 g/cm range; even when this can be done, adhesion will frequently increase upon extended contact to a degree sufficient to cause tearing or delamination upon attempted removal.

Others have tried to obtain the desired degree of adhesion by locally deactivating portions of a full coating of a psa, as taught in U.S. Pat. No. 2,515,423, but this technique has likewise proved difficult to control. The same problems are encountered in attempting to locally mask portions of a full coating of a psa, as taught in U.S. Pat. Nos. 1,944,834, 2,000,475, 3,900,642, 3,967,624, and 4,063,559, as well as in British Patent No. 1,541,311.

The prior art has also suggested applying pressure-sensitive adhesive to only portions of a backing, leaving other portions free from adhesive. Thus, it has been proposed to make spaced adhesive stripes extending in either the machine direction (U.S. Pat. No. 2,349,709) or the cross direction (U.S. Pat. Nos. 2,386,731 and 3,811,438), as well as products having spaced adhesive spots (U.S. Pat. Nos. 3,174,888 and 3,741,786). By and large, however, the spots were so large that attempted removal of the tape from newsprint will cause tearing or delamination. Prior to the present invention, then, it is believed that there has never existed a product having performance equivalent to that of the microsphere adhesives referred to above, but made with conventional pressure-sensitive adhesives.

BRIEF SUMMARY

The present invention provides a removable and repositionable adhesive product* comprising a substrate (especially sheet material such as paper) bearing on one surface a discontinuous non-repetitive** adhesive coating comprising first areas where psa is exposed and second areas where psa is not exposed. The psa is sufficiently adherent to newsprint that if sheet material having a continuous coating of the psa is applied to sheet backing in the normal manner and the adhesive surface then placed in contact with a sheet of newsprint, it cannot be peeled away at normal rates (e.g., 10-15 cm/sec) without delaminating the newsprint. The invention is based on the application of conventional pressure-sensitive adhesives to a substrate in certain critical patterns where discrete spaced areas of adhesive are carefully controlled as to size, thickness, and percentage of substrate covered. The resultant product is not only simple and economical to manufacture but also offers the first practical alternative to the use of the tacky microsphere adhesives.

* The term "removable and repositionable" is intended to refer not only to products which can be temporarily adhered to, removed from, and repositioned on paper sheets but also to products to which paper sheets can be temporarily adhered, removed, and repositioned.
** The term "non-repetitive" means that the adhesive pattern is random, as opposed to the repeating pattern obtained by using a rotogravure roll or other printing equipment.

More specifically, it has been found that the adhesive used in practicing the invention should cover about 10 to about 85% (preferably about 20 to about 60%) of the area over which adhesive is applied. Individual adhesive "islands" should be about 0.01-0.15 mm (preferably about 0.02-0.10 mm) thick and at least roughly circular, having a diameter no greater than 0.02-1.5 mm (preferably on the order of 0.05-0.08 mm). In some instances adjacent islands may join together to form a short chain or larger island, provided that at least one dimension does not exceed the stated limits. Within the limits specified, the numerical values are interrelated, depending also on the tackiness of the specific adhesive employed. To illustrate, an extremely tacky adhesive should be so applied that it is present in smaller islands or a thinner coating, or occupies a lower percentage of the backing, than a less tacky adhesive. The adhesive can be applied as from an aqueous dispersion or a solution in organic solvent, or perhaps as either a hot melt or a thick monomeric syrup that is thereafter polymerized in situ, e.g., as taught in U.S. Pat. No. 4,181,752. Even where aqueous dispersions (which are presently preferred) are applied to a paper backing, there is usually no evidence of irregular shrinking, distortion, or cockling. Coating and drying or curing procedures for "island"-coated adhesives are faster, require less energy, result in lower paper distortion, and use less adhesive than for full-coated adhesives. The resultant adhesive sheet material can be adhered to paper, allowed to remain in contact therewith for two weeks at room temperature and then removed without visibly damaging the paper. Preferred embodiments of the invention display the same peel removal force of 10-50 g/cm characteristic of microsphere adhesives, enabling them to be adhered to newsprint for extended periods of time without delaminating it upon removal.

A further embodiment of the invention includes a sheet backing or other substrate in which the population density of the adhesive islands in the discontinuous coating varies, e.g., from low at one edge of the coating pattern and high at the other or low at both edges and high in the central portion. When such a pattern is provided at the edge of a sheet of paper, so that the population density of the adhesive islands is lowest adjacent the uncoated portion of the sheet, the sheet will remain flat when it is applied to a substrate, removed, and replaced. This highly desirable performance feature is frequently not found in conventional products. For all papers, there is some adhesion force that will cause the paper to curl when a note is pulled away from a surface at an angle of 90° or greater. With a tapered adhesion profile, there is always a part of the adhesive that is too low in adhesion to curl the paper, but high enough to hold the curled portion down when it is readhered.

The desirable results described above are attained by the simple but highly unconventional process of spraying the adhesive onto the sheet backing. When adhesive is applied from a spray head in fixed position above a moving web of paper, a strip of discontinuous adhesive, perhaps 1-2.5 cm wide, is applied; masks may be employed to keep overspray from other areas. Typically the edges of the adhesive strip have a lower population density than does the center. This effect is caused by the inherent characteristics of the spray pattern emanating from a spray head, where the spacing between droplets is least at the center, gradually increasing radially outward therefrom.

BRIEF DESCRIPTION OF THE DRAWING

Understanding of the invention will be enhanced by referring to the accompanying drawing, in which like numbers refer to like parts in the several views, and in which.

DESCRIPTION OF PRESENTLY PREFERRED EMBODIMENTS

Figure 1:
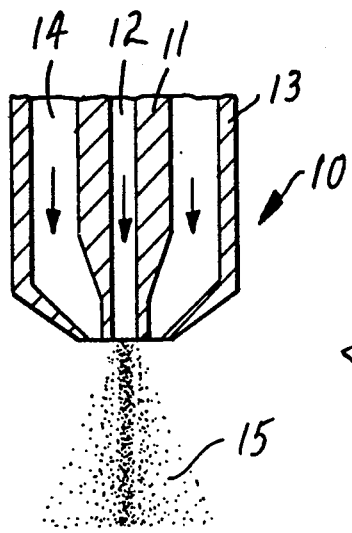
FIG. 1 is a vertical cross-sectional view of a spray head, showing the distribution of particles emanating therefrom.

In the drawing, spray unit 10 includes nozzle 11, having central channel 12, through which adhesive is supplied. Surrounding nozzle 11 and spaced radially therefrom is air cap 13, defining an annular passage through which air is supplied. As the adhesive emerges from channel 12, the annular air stream emitted from channel 14 breaks the adhesive into a cloud of small droplets 15. The pattern assumed by droplets 15 is generally circular, the greatest concentration being at the central portion, gradually decreasing to zero at the periphery. The diameter of the spray pattern is directly related to the distance between spray unit 10 and the substrate toward which adhesive droplets 15 are directed. The size of droplets 15 can be altered by appropriately adjusting spray unit pressures, and the coating weight applied to a moving substrate can be adjusted by varying either the rate at which the spray is applied or the speed at which the substrate moves. Thus, the application of a pressure-sensitive adhesive with a spray unit offers great versatility in the coating applied. Speaking in general terms, adhesive islands having smaller diameter but greater thickness can be obtained by spray coating than by printing.

For purposes of the invention, it is important that the adhesive droplets be small, e.g., on the order of 0.02 to 0.2 mm in diameter. Larger droplets result in an adhesive coating that not only tends to cause "raspy," or erratic, removal of a coated sheet from a paper substrate but also is more likely to pull paper fibers. It is much easier to produce articles coated with small adhesive "islands" by spray techniques than by conventional printing methods. It is also far easier to apply adhesive droplets in a close-spaced pattern by spray coating than by printing methods. Further, printed patterns are difficult to maintain consistently, since the application of adhesive is affected by wear of the printing roll, as well as by the unavoidable consequence of having dried adhesive or other contaminants fill in part of the cells on a rotogravure roll or the holes in a screen. It is easy to distinguish a sprayed pattern from a roll coated or printed pattern, since the latter two are repetitive, and the sprayed pattern is not.

Another consideration is the fact that spray equipment is considerably less expensive than printing equipment. Additionally, since the spray head does not contact the substrate to be coated, articles that are fragile or have irregular surfaces may be coated, whereas printing methods, especially at high speeds, cannot be effectively employed in this manner. Thus the present invention enables the preparation of note pads, labels, paper napkins, and other items that require low adhesion levels and removability.

Spray unit 10 may be of any of several types, including the so-called airless spray head. For commercial application, however, it is most practical to use spray heads that do not require frequent cleaning.

Figure 2:
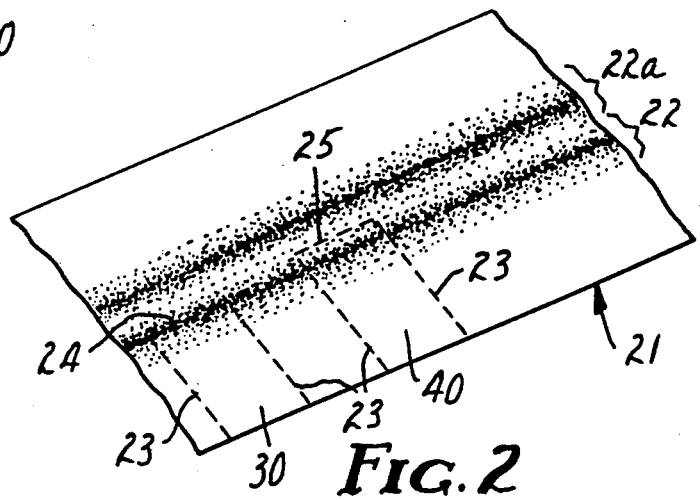
FIG. 2 is a perspective view of a sheet that has been provided with two stripes from spaced adhesive spray heads.
Figure 3:
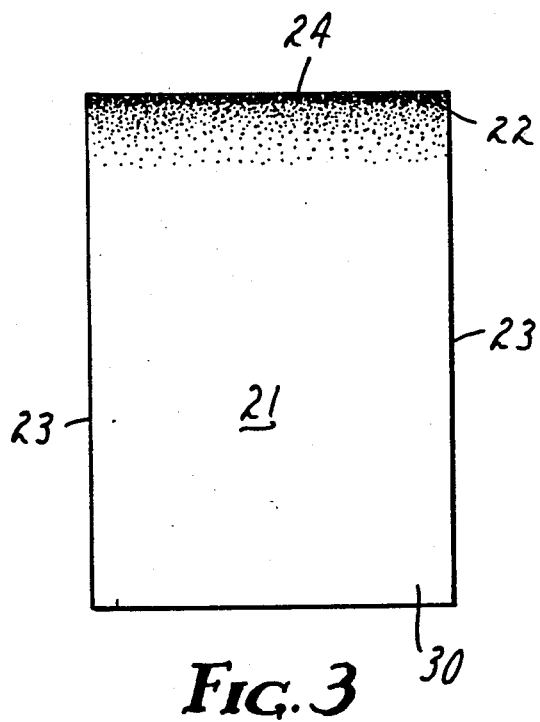
FIG. 3 is a plan view of the rear surface of a sheet that has been provided with a sprayed adhesive strip adjacent one edge.

FIG. 2 shows a portion of a web 21 that has been adhesive-coated using a pair of spray heads 10 to apply a pair of adhesive stripes 22 and 22a extending along the machine direction of web 21. Consistent with the spray pattern shown in FIG. 1 and discussed above, the population density of adhesive droplets 15 is highest at the center of stripes 22, 22a, gradually decreasing as the distance from the center increases. By die-cutting along dotted lines 23, 24 or 23, 25 shown in FIG. 2, one can then obtain removable repositionable notes 30, 40 of the type shown, respectively, in FIGS. 3 and 4. It will be observed that in each case the population density of adhesive droplets in adhesive strips 22 is lowest immediately adjacent the uncoated part of note 30 or 40, leading to an interesting advantage when the note is either removed from a pad of such notes or applied to a substrate, removed, and subsequently reapplied. When the user of note 30 or 40 removes it, typically at an angle of 90°–180°, there will be some point where the population density of the adhesive islands is high enough that the note will deform or curl, adhesive side out, along the line of greatest population density of the adhesive islands. When the note is then applied or reapplied to a substrate, the less densely populated portion of the adhesive strip 22 serves to rebond the note in a flat position. In contrast, conventionally coated notes remain curled when reapplied, causing an unsightly appearance and increasing the likelihood that they will snag on overlying sheets of paper and possibly be removed inadvertently. Others have attempted to cope with this problem by coating adhesive strips in which the edge adjacent the uncoated portion of the note has a sawtooth pattern; although effective to a degree, this technique increases the difficulty of applying the adhesive strip.

Figure 4:
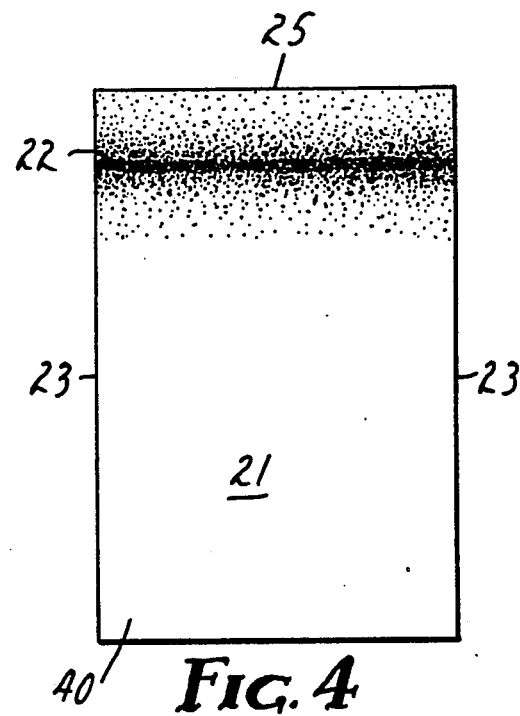
FIG. 4 is a plan view of the rear surface of a sheet similar to that of FIG. 3 except that the distribution of adhesive islands is different.

Note 30 is obtained by cutting along the densest central portion of adhesive strip 22. If desired, however, note 40 may be obtained by cutting along the opposite edge of adhesive strip 22, where the density of the adhesive islands is also low. One advantage of the product of FIG. 4 is that there is a reduced tendency for the cutting equipment to become gummed up with adhesive during the process of manufacture.

It will be recognized that if desired, spray units 10 could be so positioned above a moving web as to achieve an adhesive coating of substantially the same non-repeating pattern over whatever portion of the web it is desired to coat.

As an aid to understanding and practicing the invention, various measuring and testing techniques employed will now be described.

Percent Adhesive Coverage

The adhesive islands are first identified by rubbing black artists' charcoal into the surface of a soft rubber sheet and then pressing the adhesive onto the blackened surface, using a 3.8-cm diameter rubber roller to ensure intimate contact. The charcoal adheres to the surface of the adhesive areas but does not adhere to the uncoated portions of the paper backing. Using obliquely directed light, an image analyzing device, such as the Cambridge "Imanco" Image Analyzer No. 720, is then used to examine 16 fields, each 5 mm × 5 mm, in the densest part of the spray pattern and the 16 readings averaged.

Droplet Size Measurement

The adhesive-coated surface is examined using a 100-power microscope having an optical comparator grating. Adhesive islands can be viewed and measured directly.

Thickness Measurements

Strips approximately 1 mm wide are cut from the adhesive-coated sheet material, bent into a V shape, and positioned edgewise on the stage of the microscope used for width measurements. The height of the adhesive islands above the surface of the paper backing can be measured directly.

Peel Adhesion

The adhesive to be tested is first applied to a surface to which it will adhere tenaciously, e.g., anodized aluminum or alumina-surfaced biaxially oriented polyester film such as that described in U.S. Pat. No. 4,190,321. A 2.54-cm × 25.4-cm strip of 25 micrometer biaxially oriented polyethylene terephthalate film is then applied to the adhesive surface and rolled down with two passes of a 2-kg roller. Using a tensile testing machine, the force required to pull the polyester strip from the adhesive surface at a 90° angle at a rate of 30.5 cm per minute is then determined. Peel adhesion tests are run both immediately after sample preparation and after a specified delay that allows the adhesion bond to stabilize.

Delamination Strength

To determine the delamination strength of various types of paper, a 2.54-cm strip of 25-micrometer polyester film having a full coating of acrylate-based pressure-sensitive adhesive is placed in contact with the surface of the paper and rolled down with two passes of a 2-kg roller. The adhesive-coated strip is then pulled away from the paper at a 90° angle at a rate of 30.5 cm per minute. (It is, of course, necessary to use tape having an adhesion to the paper being tested greater than the delamination strength of the paper itself). It is interesting to note that the force required to initiate tearing or delamination of the paper is greater than the steady-state force required to continue tearing or delamination after it has occurred. This phenomenon may show why a discontinuous adhesive coating on the tape product permits its removal from a paper surface without delamination, even at forces that would cause delamination if the adhesive coating were continuous. Although a discontinuous adhesive coating may pull loose other individual fibers (which are typically 4–5 mm long and 0.01–0.03 mm in diameter), there is insufficient contact between any given adhesive island and the several adjacent fibers to permit the initial delamination to occur. In this regard, it has been found that the shape of the adhesive islands has an effect on their tendency to initiate tearing. For example, circular adhesive islands are less likely to tear paper than parallel linear adhesive islands whose width is the same as the diameter of the circular islands, especially when removal forces are exerted parallel to their long dimension.

Using the test just described, the force required to initiate tearing or delamination and the force required to continue delamination or tearing that was previously commenced for several types of paper are, respectively, as follows: manila file folder, 341 g/cm, 309 g/cm; wood-free No. 4 sulfite typewriter bond weighing 4.68 g/m$^2$, 297 g/cm, 116 g/cm; newsprint, 177 g/cm, 79 g/cm.

In the following illustrative but non-limiting examples, all parts are by weight unless otherwise noted.

EXAMPLE 1

The adhesive employed in this example was a 57% solids high-tack aqueous isoamylacrylate emulsion, commercially available from Rohm & Haas under the registered trademark "Rhoplex" N619. This adhesive was applied under a pressure of about 50 kPa to an air atomizing gun (Model CFA 700, available from A. C. Wallberg Company), air being supplied so as to dispense adhesive droplets in a conical spray pattern, the diameter of the cone being approximately 15 cm at a distance of 20 cm from the nozzle. A web of wood-free forms bond paper weighing 4.68 g/m² was passed beneath the spray gun at a distance of about 20 centimeters at a rate of approximately 90 meters per minute, after which the sprayed web was dried in a circulating air oven at about 50° C., for about 5 seconds, and a 10-cm wide strip, occupying the central part of the spray pattern, was used for further testing. A pattern this wide might be useful for coating tape and label products, gangs of spray heads making it possible to coat extremely wide webs. To obtain a narrower width spray pattern, the spray head may be positioned closer to the web. The paper was found to be substantially uniformly covered with adhesive islands occupying 27.5% of the coated area. The diameter of the islands was about 0.05 to 0.07 mm, the thickness ranging from 0.01 to 0.05 mm. The adhesion to aluminum oxide-surfaced 100-micrometer polyester film was 29.5 g/cm, and the adhesive-coated paper could be applied to newsprint, rolled down firmly, allowed to remain in place for two weeks, and removed without tearing or delaminating the newsprint. When a control was prepared by applying a full coat of the same adhesive, about 0.3 mm thick, to the bond paper backing, the peel adhesion to aluminum oxide-surfaced polyester film was about 325 g/cm width. When applied to newsprint, the full-coated product could not be removed without causing delamination; indeed, it could not be removed from even good quality bond paper without causing the paper to tear or delaminate.

In the tabulated examples that follow, certain abbreviations are used to characterize the adhesives. For convenience in reference, these abbreviations are shown below:

| Abbreviation | Type of Pressure-Sensitive Adhesive |
|---|---|
| IAA | High-tack aqueous isoamylacrylate emulsion, commercially available from Rohm & Haas under the registered trademark designation "Rhoplex" N619. |
| NBA | Aqueous N-butylacrylate emulsion, commercially available from Rohm & Haas under the registered trademark designation "Rhoplex" N580. |
| LC67 | Aqueous 98:2 n-butylacrylate:hydroxymethacrylate emulsion commercially available from Rohm & Haas under the registered trademark designation "Rhoplex" LC 67 |
| U173 | Aqueous n-butylacrylate emulsion commercially available from Union Carbide under the registered trademark designation "Ucar" 173 |
| IAMS | Aqueous 92:4:3:1 isooctylacrylate:acrylic acid:methyl methacrylate:styrene emulsion, of the type described in Ulrich U.S. Pat. Re. 24,906. |
| IOA:AA | 10% heptane solution of 95.5:4.5 isooctyl acrylate:acrylic acid copolymer of the type described in Ulrich U.S. Pat. Re. 24,906 |
| RRS | 19.8% heptane solution of 100 parts pale crepe natural rubber, 1 gram alkylated polyhydroxyphenyl (commercially available from Monsanto Chemical Company under the registered trademark designation "Santovar" A), and 75 grams of polyterpene resin (e.g., the resin commercially available from Crosby Chemicals under the registered trademark designation "Croturez" B115 or KK-187) |
| RRE | Homogeneous blend of, on a dry weight basis, 100 parts natural rubber latex (e.g., the 62.4% solids rubber latex commercially available from Firestone Tire and Rubber company under the registered trademark designation "Hartex 103"), 25 parts carboxylated SBR emulsion (e.g., the 50.5% solids SBR emulsion commercially available from Polysar Ltd. under the registered trademark designation "Polysar" XE 222), 146 parts aliphatic hydrocarbon emulsion (e.g., the 55.0% solids emulsion commercially available from Hercules Inc. under the registered trademark designation "Piccopale" 85), and 46.9 parts acid-stable emulsion of pentaerythritol ester of hydrogenated rosin (e.g., the ester commercially available from Hercules Inc. under the registered trademark designation "Pentalyn" H). |
| S6574 | Blend of, on a weight basis, 100 parts polymethyl diphenyl siloxane containing 12% phenyl (e.g., a 30% solids solution of silicone pressure-sensitive adhesive commercially available from General Electric Company under the registered trademark designation "Silgrip" PSA 6574) and 20 parts of as 10% solution of benzoyl peroxide. After coating, the adhesive was dried two minutes at 90° C. and cured an additional two minutes at 165° C. |
| S280A | Identical to S6574 except that polydimethyl siloxane (e.g., the adhesive available from Dow Corning under the trade designation 280A), was substituted for the polymethyl siloxane. |

In order to control the adhesive island thickness in the examples, adhesive emulsions are thinned with suitable amounts of water and adhesive solutions with an appropriate solvent.

Air atomizing heads, airless spray guns, electrostatic heads, and ultrasonic heads can all be employed to create adhesive patterns in conformance with the teachings of the invention. The airless spray gun produces a flow of particles in larger drops than those obtained from air atomizing guns, and less overspray results. Among the suitable airless spray guns are Model W280, available from Wagner Spray-Tech Corporation; and Model 226-153 Series K Hydrospray, available from Binks. With all spray equipment, the relative motion between the spray head and the substrate must be sufficiently rapid to deposit discrete droplets that do not cover the entire surface when dried.

The following table, which incorporates various comparative examples in which (except as other wise noted) the adhesive was applied by spray techniques, illustrates several embodiments of the invention. In most cases, the adhesive was applied from an aqueous dispersion, permitting the use of high percentages of solids at low viscosity, allowing easier cleanup, and avoiding air pollution during drying; in other cases, however, the adhesive was applied from a solution in organic solvents. It will be seen that the results achieved depend on an interrelationship of the type of adhesive (or adhesive blend), the dimensions of the adhesive-coated areas, and the percent of the coated area which is actually occupied by adhesive.

TABLE I

| Example | Adhesive Type | Adhesive 100% Coverage Peel Adhesion, g/cm | Backing | Coating Method | % Area Coated | Adhesive Island Dimensions, mm Diameter | Adhesive Island Dimensions, mm Thickness | Peel Adhesion, g/cm |
|---|---|---|---|---|---|---|---|---|
| 1* | NBA | 205 | Polyester Film | Air Spray | 7 | 0.05–1.0 | 0.03–0.06 | 3 |
| 2 | " | " | " | " | 38 | " | " | 16 |
| 3 | " | " | " | " | 66 | " | " | 47 |
| 4 | " | " | " | Airless Spray | 45 | 0.07–0.6 | 0.01–0.06 | 50 |
| 5 | " | " | " | " | 60 | " | " | 49 |
| 6* | " | " | " | " | 63 | " | " | 85 |
| 7* | S280A | 246 | Paper | Air Spray | 12 | 0.2–1.0 | <0.01 | 2 |
| 8 | " | " | " | " | 22 | " | " | 11 |
| 9 | " | " | " | " | 26 | " | " | 22 |
| 10 | S280A | 246 | Paper Polyester Film | " | 54 | " | " | 38 |
| 11 | " | " | " | " | 14 | " | " | 38 |
| 12 | " | " | " | " | 26 | " | " | 41 |
| 13* | IAA | 325 | " | " | 5 | 0.05–1.0 | 0.01–0.03 | <2.0* |
| 14 | " | " | " | " | 20 | " | " | 13 |
| 15 | " | " | " | " | 28 | " | " | 30 |
| 16 | " | " | " | " | 41 | " | " | 47 |
| 17 | " | " | " | Airless Spray | 33 | 0.07–0.6 | 0.01–0.6 | 39 |
| 18 | " | " | " | " | 65 | " | " | 69 |
| 9* | S6574 | 346 | Poly. Film | Air Spray | 11 | 0.02–0.4 | 0.01 | 79 |
| 20 | " | " | " | " | 14 | " | " | 13 |
| 21 | " | " | " | " | 25 | " | " | 35 |
| 22* | " | " | " | " | 30 | " | " | 92 |
| 23 | " | " | Paper | " | 18 | " | " | 2 |
| 24 | " | " | " | " | 43 | " | " | 6 |
| 25 | RRE | 469 | " | " | 37 | 0.1–0.5 | 0.01–0.03 | 22 |
| 26 | " | " | " | " | 49 | " | " | 30 |
| 27* | " | " | " | " | 61 | " | " | 101 |
| 28 | " | " | " | " | 62 | " | " | 69 |
| 29* | " | " | " | " | 63 | " | " | 104 |
| 30* | IAMS | 180 | Polyester Film | " | 86 | 0.02–0.4 | 0.01 | 125 |
| 31 | " | " | " | " | 81 | " | " | 70 |
| 32 | " | " | " | " | 71 | " | " | 44 |
| 33 | " | " | Paper | Syringe** | 14 | 1.2–1.5 | 0.2 | 60 |
| 34 | " | " | " | " | 23 | 1.5–2.2 | 0.1 | 77 |
| 35 | " | " | " | " | 28 | 1.5–2.0 | 0.12–0.15 | 96 |

*Comparative Example

How adhesive island dimensions affect adhesion is described in the following test:

Newsprint Fiber Picking

Ordinary wire window screen (about 4 openings per running centimeter) is dipped into the adhesive to be evaluated, removed and positioned above a sheet to be coated. A jet of air is then passed over the screen, blowing the adhesive, which is held in the mesh by surface tension, onto a sheet of bond paper. A fairly wide size range of adhesive islands is thereby generated. After the adhesive has dried, a sheet of newsprint is placed over the adhesive-coated surface and forced into intimate contact with the individual adhesive areas, using a sharp-edged plastic squeegee. After 24 hours, the newsprint is removed from the adhesive-coated surface, which is then dusted with black toner powder, the powder adhering to the adhesive particles except for those areas where the adhesive is covered by paper fiber. Since the paper fibers are essentially white, the fiber-covered areas stand out in sharp contrast to those covered with black toner powder. Adhesive areas of the various size ranges are then examined closely to determine the number of areas of a given diameter to which paper fibers are attached. Generally speaking, it has been concluded that if more than 50% of the adhesive areas of any given size remove paper fibers from the newsprint, the particle size is too large. The following table shows the interrelationship of adhesive type, adhesive area dimensions, and fiber picking tendencies.

TABLE II

| Example | Adhesive Type | Adhesive 100% Coverage Peel Adhesion, g/cm | Adhesive Island Dimensions, mm Diameter | Adhesive Island Dimensions, mm Thickness | % Fiber Picking |
|---|---|---|---|---|---|
| 39 | U173 | 100 | 0.2 | 0.04 | 10 |
| 40 | " | " | " | 0.07 | 10 |
| 41 | " | " | 0.7 | 0.04 | 50 |
| 42 | " | " | " | 0.06 | 50 |
| 43 | " | " | " | 0.07 | 100 |
| 44 | " | " | 1.0 | 0.03 | 50 |
| 45 | " | " | " | 0.04 | 50 |
| 46 | " | " | " | 0.06 | 100 |
| 47 | " | " | 1.5 | 0.03 | 80 |
| 48 | LC67 | 224 | 0.05 | 0.06 | 15 |
| 49 | " | " | 0.1 | 0.04 | 0 |
| 50 | " | " | " | 0.07 | 15 |
| 51 | " | " | 0.3 | 0.03 | 0 |
| 52 | " | " | " | 0.04 | 20 |
| 53 | " | " | " | 0.08 | 70 |

TABLE II-continued

| Example | Adhesive Type | 100% Coverage Peel Adhesion, g/cm | Adhesive Island Dimensions, mm | | % Fiber Picking |
|---|---|---|---|---|---|
| | | | Diameter | Thickness | |
| 54 | " | " | 0.5 | 0.04 | 50 |
| 55 | " | " | " | 0.05 | 70 |
| 56 | " | " | " | 0.09 | 100 |
| 57 | " | " | 0.7 | 0.15 | 100 |
| 58 | " | " | 1.0 | 0.04 | 50 |
| 59 | " | " | " | 0.05 | 50 |
| 60 | " | " | " | 0.1 | 100 |
| 61 | S280A | 246 | 0.2–1.0 | <0.01 | 0 |
| 62 | " | " | 1.5 | 0.01 | 90 |
| 63 | S6574 | 346 | 0.2–0.4 | " | 0 |
| 64 | " | " | >1.0 | " | 90 |
| 65 | RRE | 469 | 0.1–0.3 | 0.03 | 0 on 30% coverage 80 on 80% coverage |
| 66 | " | " | 0.1–0.5 | 0.01 | 0 |
| 67 | IAA | 500 | 0.05 | 0.04 | 0 |
| 68 | " | " | 0.1 | 0.06 | 15 |
| 69 | " | " | " | 0.07 | 15 |
| 70 | " | " | 0.3 | 0.03 | 0 |
| 71 | " | " | " | 0.04 | 20 |
| 72 | " | " | " | 0.08 | 70 |
| 73 | " | " | 0.5 | 0.04 | 50 |
| 74 | " | " | 0.05 | 0.05 | 70 |
| 75 | " | " | " | 0.09 | 100 |
| 76 | " | " | 0.7 | 0.15 | 100 |
| 77 | " | " | 1.0 | 0.04 | 50 |
| 78 | " | " | " | 0.05 | 50 |
| 79 | " | " | " | 0.10 | 100 |

EXAMPLE 80

A DeVilbiss AGB Series 501 air atomizing spray unit having an AV 15FX nozzle and a No. 48 aircap was mounted 30 cm above a web of 20 lb. (34 g/$^2$m) forms bond paper, which was moved at 45 m/sec. Using an atomizing air pressure of 20–50 psi (about 140–350 kPa) a 55% solids aqueous IAMS emulsion, having a viscosity of 355 cps (0.355 Pa.s), was supplied to the nozzle. As a result, the paper web was coated with adhesive droplets that formed islands ranging from 0.02 to 0.13 mm in diameter and about 0.2–0.05 mm in thickness. Higher air velocities or higher droplet velocities will cause the droplet to flatten out more when it strikes the paper. A lower viscosity adhesive will also cause the droplet to flatten. By increasing the viscosity of the adhesive and reducing the velocity of the droplet as it strikes the paper, the droplet can assume a nearly spherical shape on top of the paper. All will be more or less hemispherical, due to surface tension, but the radius of the droplet will vary. Adhesion of the coating, measured in accordance with the previously described test, was 23–28 g/cm width.

EXAMPLES 81 and 82

Using the same spray unit and coating conditions as in Example 80, a 61% solids aqueous emulsion of a 1:1.2 IAMS:adhesive microspheres of the type described in U.S. Pat. No. 3,691,140, having a viscosity of 158 cps (0.158 Pa.s) was sprayed onto the bond paper web, the distance between the spray unit and the web being fixed at 20 cm and 30 cm. Results are tabulated below:

| | Examples | |
|---|---|---|
| | 81 | 82 |
| Spray unit-web distance, cm | 20 | 30 |
| Adhesion, g/cm | 37 | 15 |
| Island thickness, mm | 0.02–0.05 | 0.02–0.05 |
| Total spray diameter, cm | 4–8 | 6–10 |

-continued

| | Examples | |
|---|---|---|
| | 81 | 82 |
| Overall coverage, % | | |
| Average Coverage, % | 65 | 41 |
| Average Adhesion, (g/cm) | 46.1 | 18.5 |
| Center of Pattern | | |
| Coverage, % | 74 | 45 |
| Adhesion, g/cm | 58.3 | 23.2 |
| Edge of Pattern | | |
| Coverage, % | 5–9 | 5–9 |
| Adhesion, g/cm | 2–4 | 2–4 |

The present invention is also applicable to the preparation of unique products for which there has existed a long-felt need. It is widely recognized, for example, that the paper used for disposable towels, tissues, and napkins are light weight and have very little internal strength. It is also recognized that such products have a distressing tendency to slide from the place they are designated to protect, often at the most inopportune moment. If a conventional coating of pressure-sensitive adhesive could be applied, it would serve to hold products of this type in position. It is, however, impractical or impossible to apply a conventional layer of pressure-sensitive adhesive by roll coating or rotogravure coating without tending to pick the paper apart during the coating operation. In addition, the adhesive properties of the conventional pressure-sensitive adhesive coating are sufficiently strong that the adhesive-coated paper would tend to delaminate on removal, leaving the user with a filmy paper product bonded to his clothing by a tenaciously bonded adhesive.

The present invention, which teaches a method of non-contact spray coating to achieve a discontinuous coating, overcomes the problems just described. This coating method will not drive the adhesive deep into the paper substrate and can be used on rough or embossed surfaces. Using a DeVilbiss spray gun (Model AGB 544 with a #110 air cap and an AV 1115FX-S nozzle, an acrylate emulsion adhesive having a solids content of 52% and a viscosity of 0.179 Pa.s was sprayed on the exposed edges of shingled stacks of single-ply yellow embossed napkins, tissues, and single-ply paper towelings. Each of the resultant products had an adhesive coating on the exposed portions in which the droplet diameter was 0.02–2.5 mm and the thickness was 0.02–0.06 mm. When placed on a wide variety of fabrics, each product remained in fixed position but could be readily removed without delamination. Individual sheets of the paper products could be protected by arranging them in pad format, rolling the shingled sheets into a roll, applying a cover sheet over the adhesive, folding each sheet so that it covered its own adhesive, folding the last sheet of paper in the stack back over its adhesive, etc.

It has also been found that tacky elastomeric microspheres (e.g., of the type described in U.S. Pat. No. 3,857,731) can also be included in the adhesive dispersions applied by the spray techniques described hereinabove, the microspheres becoming bonded to the backing by the dispersed adhesive.

In view of the foregoing applications for the invention, it is reasonable to use the same spray technique to coat conformable paper, plastic film, or aluminum foil substrates.

What is claimed is:

1. A method of making a removable and repositionable adhesive sheet product comprising spraying onto a sheet backing material a solution or dispersion of a normally tacky and pressure-sensitive adhesive in a liquid carrier and thereafter evaporating the liquid carrier, leaving a non-repetitive discontinuous pattern of spaced islands of adhesive, the pressure-sensitive adhesive being sufficiently adherent that, if sheet material having a continuous coating of said adhesive is applied to newsprint, it cannot be peeled away at normal removal rates without tearing or delaminating said newsprint, the adhesive islands being on the order of 0.01 to 0.15 millimeter thick, having at least one other dimension no greater than 0.02–1.5 millimeters, and occupying from about 10–85% of the area over which adhesive is applied, so as to achieve an adhesion to polyester film on the order of 8–80 grams per centimeter width, whereby said adhesive product can be adhered to newsprint, allowed to remain in contact therewith for two weeks at room temperature and then removed without visibly damaging the newsprint.

2. A method of making a removable and repositionable adhesive sheet product comprising spraying onto a sheet backing material a solution or dispersion of a normally tacky and pressure-sensitive adhesive in a liquid carrier and thereafter evaporating the liquid carrier, leaving a non-repetitive discontinuous pattern of spaced islands of adhesive, the pressure-sensitive adhesive being sufficiently adherent that, if sheet material having a continuous coating of said adhesive is applied to newsprint, it cannot be peeled away at normal removal rates without tearing or delaminating said newsprint, the adhesive islands being on the order of 0.01 to 0.15 millimeter thick, having at least one other dimension no greater than 0.02–1.5 millimeters, and occupying from about 10–85% of the area over which adhesive is applied, so as to achieve an adhesion to polyester film on the order of 8–80 grams per centimeter width, whereby said adhesive product can be adhered to newsprint, allowed to remain in contact therewith for two weeks at room temperature and then removed without visibly damaging the newsprint and; wherein the backing material is an elongate web and the solution or dispersion of adhesive is applied in a strip extending along the machine direction of the web.

3. A method of making a removable and repositionable adhesive sheet product comprising spraying onto a sheet backing material a solution or dispersion of a normally tacky and pressure-sensitive adhesive in a liquid carrier and thereafter evaporating the liquid carrier, leaving a non-repetitive discontinuous pattern of spaced islands of adhesive, the pressure-sensitive adhesive is sufficiently adherent that, if sheet material having a continuous coating of said adhesive is applied to newsprint, it cannot be peeled away at normal removal rates without tearing or delaminating said newsprint, the adhesive islands being on the order of 0.01 to 0.15 millimeter thick, having at least one other dimension no greater than 0.02–1.5 millimeters, and occupying from about 10–85% of the area over which adhesive is applied, so as to achieve an adhesion to polyester film on the order of 8–80 grams per square centimeter width, whereby said adhesive product can be adhered to newsprint, allowed to remain in contact therewith for two weeks at room temperature and then removed without visibly damaging the newsprint; wherein the strip of adhesive has a high population density of adhesive islands in one longitudinally extending area and a gradually decreasing population density toward at least one side of the strip.

4. A method of making a removable and repositionable adhesive sheet product comprising spraying onto a sheet backing material a solution or dispersion of a normally tacky and pressure-sensitive adhesive in a liquid carrier and thereafter evaporating the liquid carrier, leaving a non-repetitive discontinuous pattern of spaced islands of adhesive, the pressure-sensitive adhesive is sufficiently adherent that, if sheet material having a continuous coating of said adhesive is applied to newsprint, it cannot be peeled away at normal removal rates without tearing or delaminating said newsprint, the adhesive islands being on the order of 0.01 to 0.15 millimeter thick, having at least one other dimension no greater than 0.02–1.5 millimeters, and occupying from about 10–85% of the area over which adhesive is applied, so as to achieve an adhesion to polyester film on the order of 8–80 grams per square centimeter width, whereby said adhesive product can be adhered to newsprint, allowed to remain in contact therewith for two weeks at room temperature and then removed without visibly damaging the newsprint; wherein the strip of said adhesive has a high population density of adhesive islands in the central longitudinally extending area and a gradually decreasing population density toward both edges of the strip.

5. A method of making a removable and repositionable adhesive sheet product comprising spraying onto a sheet backing material a solution or dispersion of a normally tacky and pressure-sensitive adhesive in a liquid carrier and thereafter evaporating the liquid carrier, leaving a non-repetitive discontinuous pattern of spaced islands of adhesive, the pressure-sensitive adhesive being sufficiently adherent that, if sheet material having a continuous coating of said adhesive is applied to newsprint, it can not be peeled away at normal removal rates without tearing or delaminating said newsprint, the adhesive islands being on the order of 0.01 to 0.15 millimeter thick, having at least one other dimension no greater than 0.02–1.5 millimeters, and occupying from about 10–85% of the area over which adhesive is applied, so as to achieve an adhesion to polyester film on the order of 8–80 grams per centimeter width, whereby said adhesive product can be adhered to newsprint, allowed to remain in contact therewith for two weeks at room temperature and then removed without visibly damaging the newsprint and; wherein said adhesive islands occupy from about 20 to about 60% of the area over which the adhesive is applied.

* * * * *

UNITED STATES PATENT AND TRADEMARK OFFICE
CERTIFICATE OF CORRECTION

PATENT NO. : 5,194,299
DATED : March 16, 1993
INVENTOR(S) : Fry

It is certified that error appears in the above-indentified patent and that said Letters Patent is hereby corrected as shown below:

Col. 9, line 19, Delete "9"" and insert --19"--
Col. 11, line 41, Delete "0.2" and insert --0.02--
Col. 14, line 11, Delete "of adhesive, the" and insert --wherein--
Col. 14, line 36, Delete "of adhesive, the" and insert --wherein--

Signed and Sealed this

Twenty-fourth Day of October, 1995

Attest:

BRUCE LEHMAN

Attesting Officer        Commissioner of Patents and Trademarks